United States Patent [19]

Devaney et al.

[11] Patent Number: 4,648,039

[45] Date of Patent: Mar. 3, 1987

[54] COMPRESSIONAL/SHEAR WAVE SEPARATION IN VERTICAL SEISMIC PROFILING

[75] Inventors: Anthony J. Devaney, Ridgefield; Michael L. Oristaglio, New Fairfield, both of Conn.; Emil Wolf, Rochester, N.Y.

[73] Assignee: Schlumberger Technology Corporation, New York, N.Y.

[21] Appl. No.: 567,359

[22] Filed: Dec. 30, 1983

[51] Int. Cl.[4] .......................... G01V 1/36; G01V 1/34; G01V 1/28
[52] U.S. Cl. ..................................... 364/421; 367/68; 367/47
[58] Field of Search ...................... 364/422, 421, 420; 367/59, 68, 79

[56] References Cited

U.S. PATENT DOCUMENTS

| | | | |
|---|---|---|---|
| 4,218,765 | 8/1980 | Kinkade | 364/421 |
| 4,316,267 | 2/1982 | Ostrander | 367/59 |
| 4,316,268 | 2/1982 | Ostrander | 367/59 |
| 4,344,158 | 8/1982 | Landrun, Jr. et al. | 364/421 |
| 4,383,308 | 5/1983 | Caldwell | 361/31 |
| 4,393,488 | 7/1983 | Gassaway et al. | 364/421 X |
| 4,397,005 | 8/1983 | Gassaway et al. | 364/421 X |
| 4,422,165 | 12/1983 | Thomas et al. | 364/421 X |
| 4,513,376 | 4/1985 | Barber | 364/422 |
| 4,528,649 | 7/1985 | Gassaway et al. | 364/421 X |
| 4,532,618 | 7/1985 | Wener | 364/421 |
| 4,534,019 | 8/1985 | Wiggins et al. | 364/421 X |

OTHER PUBLICATIONS

Dankbaar, J. W. M., Separation of P and S Waves, presented in Jun. 1984 at a meeting of the European Association of Exploration Geophysicists–E.A.E.G., believed to have been submitted to the E.A.E.G. in Feb. 1984, and believed not to have been published in printed form as of Oct. 1985.
Hardage, B. A., Vertical Seismic Profiling, Part A: Principles, Geophysical Press, 1983, vol. 14A of Handbook of Geophysical Exploration, Section I, Helbig and Treitel (Editors): Front cover, title page, pp. 1-10, 174-182, 322-335, 406-415 and 421-446.
Society of Exploration Geophysics, Expanded Abstracts of the Technical Program with Authors' Biographies, Sep. 11-15, 1983, Las Vegas, Nev., pp. 522-540.
Wuenschel, P. C., The Vertical Array in Reflection Seismology–Some Experimental Studies, Geophysics, vol. 41, No. 2, (Apr. 1976), pp. 219-232.
Chapman, C. H., Generalized Radon Transforms and Slant Stacks, Geophys. J. R. ASTR. Soc. (1981) 66, 445-453.
Shepp, L. A., et al., (1974), The Fourier Reconstruction of a Head Section, IEEE Trans. Nuclear Science NS-21(3), 2143, 96.

Primary Examiner—Jerry Smith
Assistant Examiner—Charles B. Meyer
Attorney, Agent, or Firm—Cooper, Dunham, Griffin & Moran

[57] ABSTRACT

Disclosed is separation of the compressional and shear components of the wavefield measured in 3-component vertical seismic profiling. The separation involves working in the zx plane defined by the borehole axis (z) and the surface seismic source, and in successive and overlapping windows each defined by (i) a depth interval centered at the depth level currently being processed and including several depth levels above and below and (ii) a time interval sufficiently long to include the receipt of the relevant seismic energy by the geophones. The total wavefield measurements in a window are rotated to give the energy along the borehole axis (z) and that perpendicular to it in the zx plane of interest, the result is forward Fourier transformed in two dimensions, then filtered in wavenumber-frequency space by means of a matrix filter which depends on previously estimated compressional and shear speeds of the region that produced the VSP measurements being filtered, and the result is inverse Fourier transformed to derive the compressional component. Subtracting the compressional component from the total measured wavefield gives the shear component. The corresponding operations performed entirely in the spatial domain give corresponding results.

36 Claims, 14 Drawing Figures

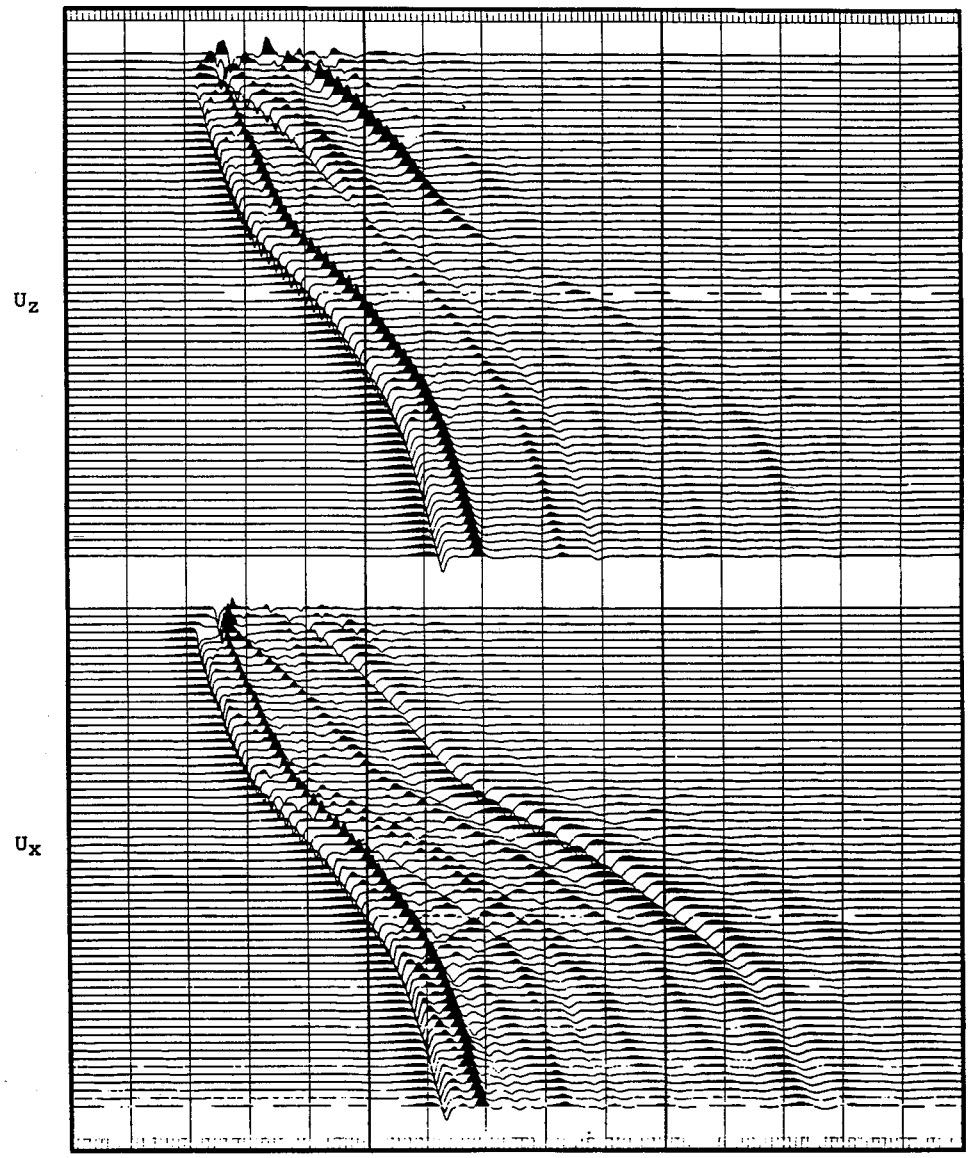
F I G. 9

COMPRESSIONAL/SHEAR WAVE SEPARATION IN VERTICAL SEISMIC PROFILING

BACKGROUND AND SUMMARY OF THE INVENTION

The invention is in the field of seismic surveys useful in exploring for valuable subsurface resources. One aspect of the invention concerns vertical seismic profiling and more particularly separating the compressional and shear components of the vector wavefield measured in vertical seismic profiling. Another aspect concerns similar separation in surface seismics (also called horizontal profiling).

Vertical seismic profiling, often abbreviated as VSP, is a technique in which a seismic signal generated at or near the surface of the earth is recorded by geophones secured at various depths to the wall of a borehole. Unlike the more commonly used horizontal seismic profiling, where the geophones are strung along the earth surface, vertical seismic profiling uses geophones at locations spaced along the borehole axis. These geophones typically respond to both upgoing and downgoing seismic events, in contrast to horizontal seismic profiling, where the geophones typically cannot respond directly to downgoing events. The distance between geophone recording locations in vertical seismic profiling is typically a small fraction of that used in horizontal profiling.

Vertical seismic profiling measurements can give insight into some fundamental properties of propagating seismic waves and assist in the structural, stratigraphic, and lithological interpretation of subsurface formations. For example, an important use of VSP measurements is to help define upgoing and downgoing seismic events within the earth and thereby help determine which events arriving at the surface are primary reflections and which are multiples. Other applications of VSP include estimation of reflector dip, correlation of shear wave reflections with compressional wave reflections, location of fault planes, determination of lithological effects on propagating wavelets, looking for reflectors ahead of the drill bit, determining hydrocarbon effects on propagating wavelets, identification of intrabed multiples, measurement of both compressional and shear wave velocities, and estimation of the conversion of compressional to shear and shear to compressional energy modes within the earth. Background information concerning VSP can be found in Hardage, B. A., Vertical Seismic Profiling, Part A: Principles, Geophysical Press, 1983, Volume 14A of Handbook Of Geophysical Exploration, Section I. Seismic Exploration, Helbig and Treitel (Editors); Society of Exploration Geophysics, Expanded Abstracts of the Technical Program With Authors' Biographies, Sept. 11-15, 1983, Las Vegas, Nev., pp. 522-540; Wuenschel, P. C., The Vertical Array In Reflection Seismology—Some Experimental Studies, Geophysics, Volume 41, No. 2 (April 1976), pp. 219-232; and U.S. Pat. No. 4,383,308.

As discussed in greater detail in these background documents, which are hereby incorporated by reference, in principle vertical seismic profiling involves providing a seismic source at or near the earth surface and near a borehole, and providing vertical seismic profile measurements by means of geophones positioned at selected depth levels in the borehole. While it should be possible to position geophones at each desired depth in the borehole such that all can respond to the same seismic event generated by the source, it is believed typical, at least in the Western world, to use instead a geophone (or geophones) carried by a single seismic tool which is suspended by cable in the borehole and is successively clamped to the borehole wall at selected depths, to thereby respond to different wavelets from the source at different depths. Various kinds of seismic sources can be used, and typically it is desirable that the source produce a consistent and repeatable shot wavelet, particularly when a single downhole geophone tool is used. For example, the source can be a small chemical explosive shot near the bottom of a relatively shallow, cased and cemented well drilled near the borehole, or it can be one of the impulsive surface sources, such as weight droppers and devices that use explosive gases or compressed air to drive a heavy pad vertically downward with great force, or vibrators of the kind used as energy sources in hydrocarbon exploration. The borehole can be vertical or deviated, so long as the deviation is accounted for in interpreting the measurements, and can be cased or uncased. A typical downhole tool used in vertical seismic profiling typically contains at least one geophone that is sufficiently protected to withstand the adverse environment in a deep borehole and yet can achieve satisfactory acoustic coupling with the formation. Two typical configurations are a tool that has a retractable electrically operated pivot arm which can press the geophone(s) against the borehole wall at selected depth levels, and a tool with a retractable electrically driven telescoping ram serving the same purpose. The geophone transducer element or elements in a VSP tool can be either only vertically oriented or can be, for example, in a 3-component orientation (e.g., orthogonal at xyz or tilted relative to each other at some other angle, e.g., at 54°). In 3-component xyz geometry, the geophone along the z (depth) axis in a vertical borehole measures vertical particle motion, and the geophones oriented along the x and y directions measure particle motion along two orthogonal directions in the horizontal plane. Typically the three geophones are designed to exhibit closely matched amplitude and phase responses, and the device that presses the tool against the borehole wall is designed to create a geophone-to-formation bond which would result in the horizontal geophones being mechanically coupled to the formation in the same way as the vertical geophone. A 3-component tool typically also includes an orientation measuring device (typically made up of one or more magnetometers that measure azimuth from magnetic North and one or more gravity sensitive accelerometers that measure deviation from vertical), a downhole digitizing system which can digitize the geophone transducer outputs within the tool and send the digitized signals up to the surface through wires in the cable suspending the tool, and other equipment, such as devices to check the quality of acoustic coupling with the formation. Known processing equipment and techniques can be used at the surface to record the tool outputs and make preliminary corrections, such as for tool orientations, to thereby produce vector measurements which can be designated $u(x=0, z, t)$. Each such measurement can be a digitized vector set identifying the direction in space and the magnitude of the seismic energy measured by the 3-component VSP tool at the borehole ($x=0$) at depth $z$ from each sample time $t$ over a selected time interval.

Typically the output of any given geophone contains contribution from both compressional and shear wave components (and may contain contributions from other wave components) even when the surface seismic source is designed to optimize the generation of compressional and minimize the generation of shear waves. Even if the surface source could generate a purely compressional wave, a considerable amount of compressional wave energy may still be converted into shear wave modes whenever a propagating compressional wave encounters a reflecting surface at an oblique angle of incidence. It is believed that these converted shear wave modes can be valuable for interpreting subsurface geological conditions, as can be shear modes deliberately created by shear wave energy sources. For example, converted shear wave modes can be particularly valuable seismic measurements when used in concert with compressional wave energy measurements to interpret elastic constants of rocks or to predict the types of pore fluids in rock units or to predict other subsurface lithology parameters. In addition, certain techniques can benefit from such separation because they need, or are believed to work better with, direct or indirect measurements of only the compressional, or only the shear components of the total energy arriving at downhole geophones. One example is the use of a technique similar to medical computed tomography and relying on offset VSP, or on well-to-well VSP measurements to image the zx plane of interest. Such a technique is helped by the use of data representing the separated compressional (or perhaps shear) component of the total energy measured at the downhole geophones. In surface seismics, typically it is assumed that the geophones measure primarily the compressional component of the arriving seismic energy, and it is believed that typically little or no effort is made to separate the shear component contributions and thereby improve the results of processes based on compressional wave considerations.

For these and other reasons, proposals have been made in the past to separate the compressional and shear wave components of the seismic energy measured at a VSP geophone. For example, the Hardage document cited earlier proposes, e.g. at page 413, that with a 3-component tool the responses of the triaxial geophone system can be mathematically rotated so that they represent the output of a single geophone oriented along the ray path of the compressional wave first arrival at each recording level, and that data can be derived which represent the response that a geophone would record if it were positioned in a vertical plane containing the compressional wave first arrival ray path and then oriented in this plane so that it is normal to the compressional wave ray path, and that these data thus would contain the full response of those downgoing shear velocity modes which travel along the same ray path as the compressional wave direct arrival, partial responses of SV modes which arrive at the triaxial geophone arrangement along ray paths that differ from the compressional wave ray path, and partial responses of later arriving downgoing or upgoing compressional wave events whose ray paths intersect the geophone assembly at various angles of inclination. The earlier cited document concerning the technical program of Sept. 11-15, 1983 in Las Vegas, Nev. proposes, e.g. at page 522, that for processing VSP data from compressional wave or shear wave sources, the apparent velocity between recording positions can be used to separate upgoing and downgoing waves, and that similarly, the P, SV, and SH modes for the direct arrival in a VSP can be isolated, based on their orthogonal polarization, but reports that both techniques break down when analyzing complex wave types such as converted waves. The same document proposes at pages 524-527 a technique which involves considering the first compressional (P) ray as included in the source-well plane, deriving a projection along the first arriving P ray, which should give mainly the first arriving P ray and following multiples, deriving a projection which is normal to the first arriving P ray and is in the source-well plane, which should give direct and converted shear SV waves, and deriving a projection normal to the source-well plane, which should give shear SH waves. The Hardage document cited earlier observes, e.g. at pages 177 and 178, that when VSP measurements taken in the space-time domain are converted to the frequency-wavenumber domain, a masking function could be superimposed over the VSP data in the frequency-wavenumber domain in order to suppress events not travelling with compressional velocity, and gives a conceptual illustration at FIG. 5-20 of a so-called pie slice velocity band pass masking function which would reduce the magnitudes of all energy modes except the upgoing compressional reflections. Other types of frequency-wavenumber velocity filtering are also discussed in the Hardage document, e.g. at pages 174-176.

It is believed that said earlier separation proposals can give useful results when the subsurface environment is relatively simple, e.g., when it can be expected that compressional and direct and converted shear modes would not arrive at a given geophone location at the same time. However, in practice the typical environment is sufficiently complex to defeat such velocity or polarization separation techniques. Therefore, it is believed that a need remains for accurately and efficiently separating the compressional and shear wave components in seismic profiling, and it is this need that the invention seeks to meet.

The invention makes use of the unexpected discovery that, if certain assumptions are made about the properties of the geological formation and the wavefield, and some knowledge available from other logs is used, it is possible to relate the compressional wave component to the total measured wave vector through an analytical expression which can be sufficiently accurate to give useful results. The assumptions believed most important are that the subsurface formation is locally homogeneous (over intervals of at least about 3 wavelengths) in the region of the measurements, and that the elastic wavefield is approximately constant in the direction normal to the plane containing the source and the borehole. The knowledge derived from other logs (e.g., sonic) is the local compressional and shear velocities. In principle, the main steps of a process in accordance with the invention are to decompose the 3-component measurements into local plane wave components, to identify the P waves and S waves of each plane wave component by their polarization, and to separately recombine the so-identified P and S waves.

In a particular and nonlimiting example, the sought compressional component is related to the total measured wavefield vector through a transfer function (filter) in matrix from which depends on local acoustic properties of the formation, and hence typically changes with borehole depths. These local properties are measured or deduced beforehand, for example by compressional and shear sonic well logging. As a specific example, the variations of compressional velocity and shear velocity with borehole depth are measured, e.g. by compressional wave source and by shear wave source sonic logging, and the results are used to produce a 2-dimensional matrix filter. Vertical seismic profiling is then used to measure the vector wavefield for each depth level of interest, e.g. with a 3-component tool. After any preliminary processing (e.g. to account for tool orientation and seismic energy attenuation), a subset made up of measurements within a given window in borehole depth and in time is forward Fourier transformed, for example by a commercially available FFT processor, to convert it to measurements in a corresponding window in wavenumber-frequency space. The resulting subset of converted measurements is then combined, for example in a dot product operation, with the transfer function (filter) for the borehole depth interval in that window. The result is subjected to inverse Fourier transformation, for example again by means of a commercially available FFT processor, to thereby derive a vector quantity representative of the compressional wave vector at the given borehole depth. Vector subtraction of this compressional wave vector from the total masured vector wavefield for that depth gives a vector quantity representative of the shear wave vector component at the same given borehole depth. The procedure is repeated for other depth levels. The corresponding steps carried out entirely in the spatial domain, without excursions into wavenumber-frequency space, give corresponding results. The invented principles, while described in detail only for VSP separation, apply to surface seismics separation as well.

BRIEF DESCRIPTION OF THE DRAWINGS

FIG. 9 illustrates VSP measurements which would be made in a formation such as that shown in FIG. 8: the top part of FIG. 9 shows the z component of the total wavefield and the bottom part the x component.

DETAILED DESCRIPTION

Figure 1:
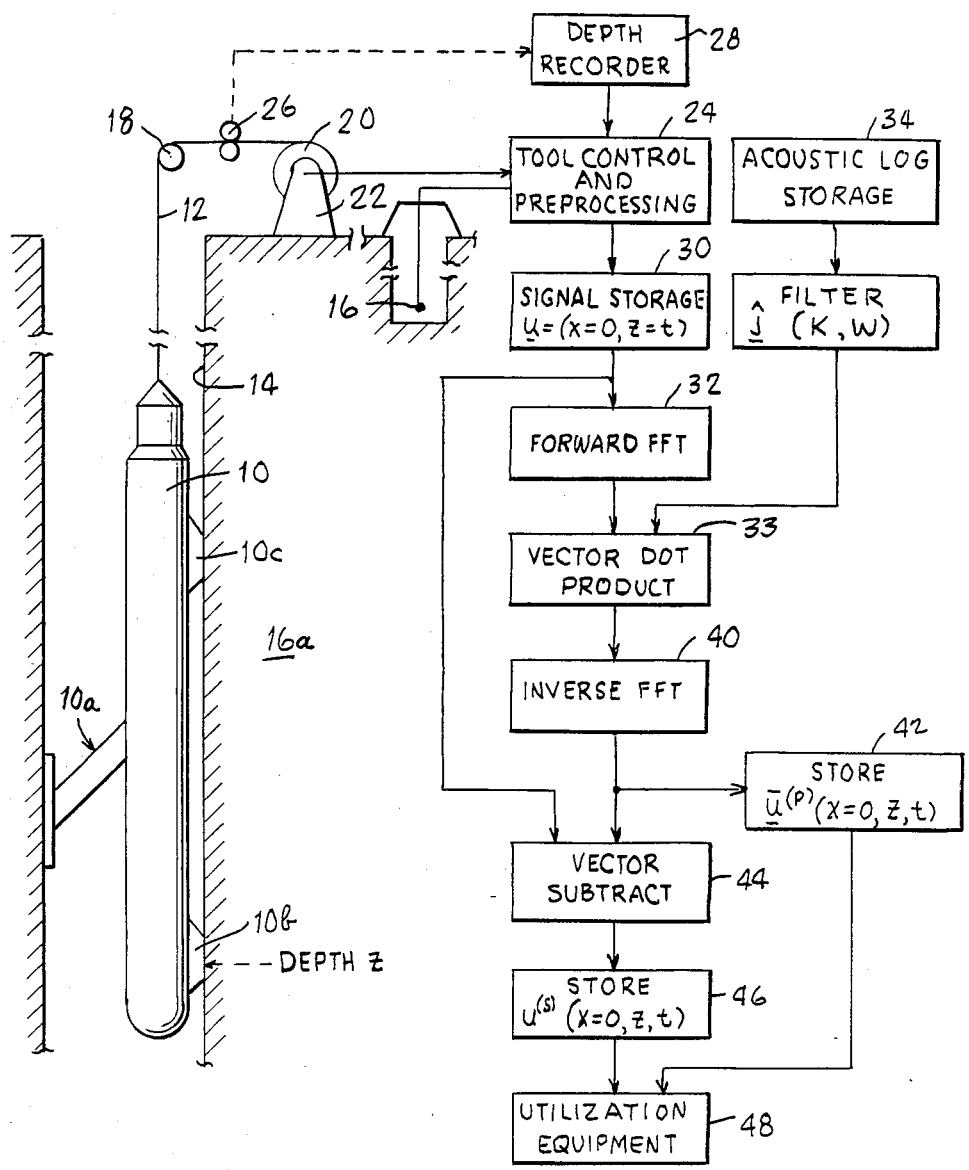
FIG. 1 is an overall schematic illustration of a vertical seismic profiling system making use of an exemplary embodiment of the invention.

Referring to FIG. 1 for an overall schematic illustration of a vertical seismic profiling system making use of a non-limiting example of the invention, a VSP tool 10 is lowered on an armored multiconductor cable 12 into a borehole 14 to take VSP measurements of subsurface formations 16a. Tool 10 is adapted for movement up and down borehole 14 and includes pivoted, power-driven clamping arm arrangement 10a, geophone pad 10b, another pad 10c and various internal subsystems. Tools of this type are discussed in the documents incorporated by reference, and a particular tool suitable for the purpose is used by Schlumberger Limited, the parent company of the assignee of this invention. The geophones in pad 10b are clamped against the wall of borehole 14 at borehole depth level z by means of arm 10a, and measure seismic energy originating at a seismic source 16. These measurements are digitized by circuitry (not shown) in tool 10, and the result is sent up via conductors within armored cable 12. Cable 12 goes to a sheave wheel 18 at the surface and then to a suitable drum and winch mechanism 20 which raises and lowers tool 10 in borehole 14 as desired. Electrical connections between tool 10 and surface equipment are made through suitable multielement slipring and brush contact assembly 22. A surface unit 24 contains tool control and preprocessing equipment which communicates with tool 10 via cable 12, and with seismic source 16 via another cable. Cable 12 also runs through a measuring wheel unit designated 26 which provides signals indicative of the current borehole depth level z of geophone pad 10b. These depth signals are recorded at unit 28 so that a given set of outputs of the geophones in pad 10b can be associated with a respective depth in the borehole.

In operation, tool 10, with clamping arm 10a retracted, is lowered to the bottom of borehole 14 (or to the lowest depth level of interest), arm 10a is extended to clamp pad 10b in good acoustic contact with the wall of borehole 14, and a seismic signal is generated at source 16. The acoustic energy measured by the geophones in pad 10b is digitized and sent up to unit 24 for any preprocessing, such as to account for tool orientation and seismic energy attenuation with travel time, and the resulting measurements are stored in unit 30, for example in the form of a vector set u(x=0, z, t), which stands for the vector wavefield measured for borehole depth level z at sample times t and includes a component along the borehole and a component which is perpendicular to the borehole but is in the plane which contains the measurement location and the seismic source location. Tool 10 is then moved up along the borehole such that pad 10b can be clamped satisfactorily at another selected depth level, another seismic signal is generated at source 16 and the seismic energy arriving at the geophones in pad 10b is similarly measured and recorded in signal storage unit 30. The same procedure is repeated for all desired depth levels in the borehole, to thereby store in unit 30 the desired sequence of vertical seismic profiling measurements from borehole 14 in vector form.

Figure 2:
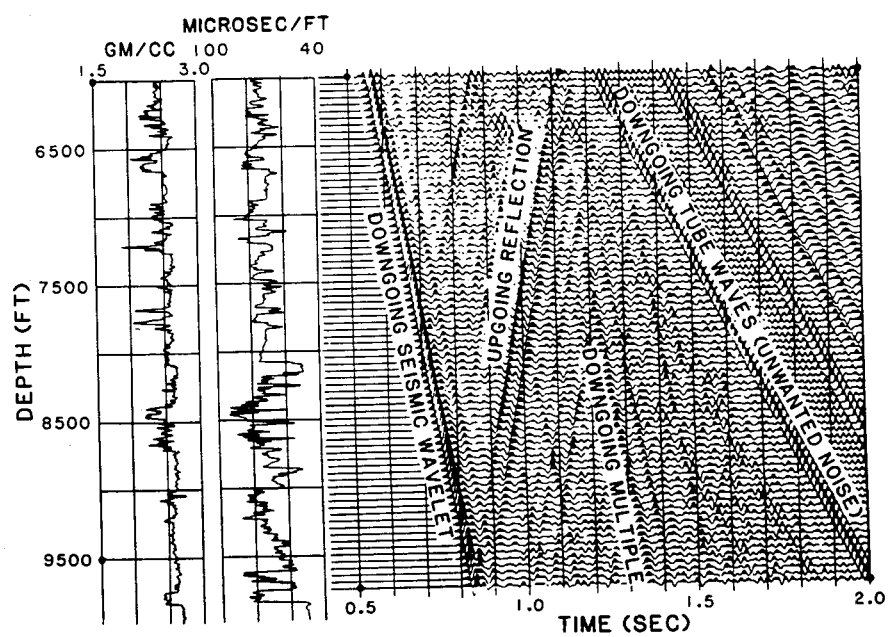
FIG. 2 illustrates a conventional record of vertical seismic profiling measurements.

The VSP measurements in storage unit 30 can be used to produce a conventional VSP record on a time versus depth grid, such as illustrated in FIG. 2, where the vertical dimension is depth along the borehole, the horizontal dimension is time and the filled-in black areas indicate the amplitude of acoustic energy received by downhole geophones. The line designated "downgoing seismic wavelet" is made up of the measurements at successive depth levels in the borehole of seismic energy which is believed to have traveled downwardly from the seismic source to the geophones. As can be expected, the further down the geophones are, the more time it takes for the seismic signal to reach them. The line labeled "upgoing reflection" slopes in the opposite direction and is assumed to be the result of acoustic energy which has traveled down to a reflector at the bottom of the measured borehole depth interval, has been reflected thereby and has reached the geophones after traveling up through the formation. A line labeled "downgoing multiple" suggests the measurement of energy which has traveled down to a reflector, up to another reflector, then down again to the geophones. The line labeled "downgoing tube waves" suggests measurements of the energy which has propagated down the borehole fluid.

Figure 3A:
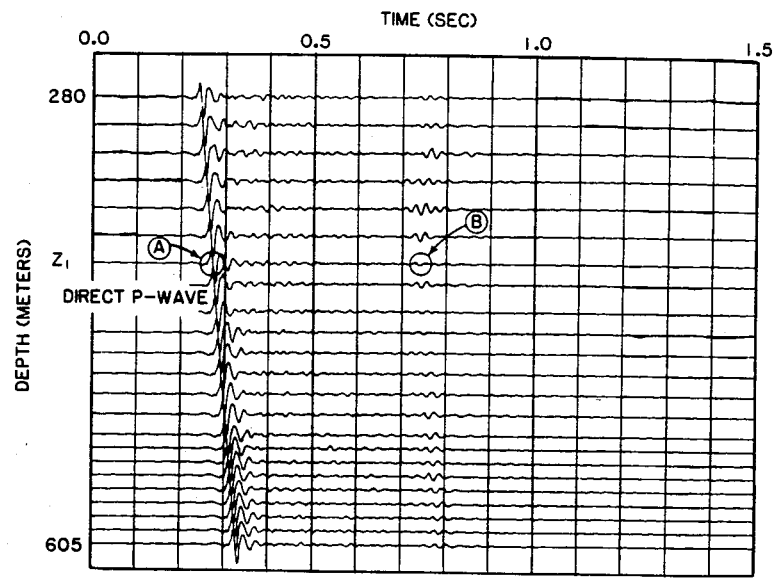
FIGS. 3a and 3b illustrate certain known attempts to separate compressional and shear components.
Figure 3B:
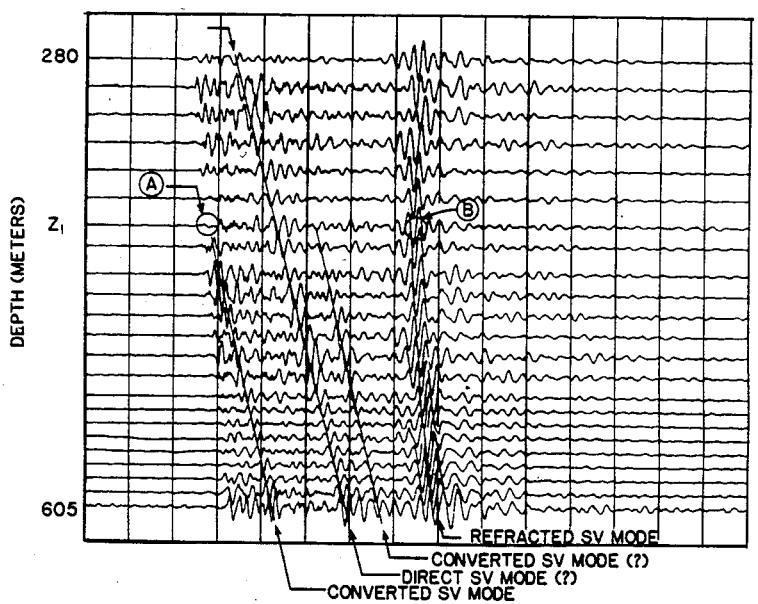

As earlier mentioned, VSP measurements recorded with a triaxial geophone system can be mathematically rotated in space to emphasize selected wave modes. In principle, if a single, elastic wave crosses an array of seismic receivers along a borehole in a homogeneous, isotropic medium, then the particles at the borehole will vibrate in the direction of travel of the wave if it is a P wave and in a direction normal to that direction if it is an S wave. With a 3-component tool, all that would have to be done in such a case is to determine the wave's direction of travel and compare it with the direction of measured particle motion. If the P and S wave velocities in the medium are known, and if it is assumed that the wave travels in the source-borehole plane, the wave direction can be found from the arrival times of the wave at the different receivers along the borehole. As an example of a prior art approach believed based on such considerations, FIG. 3a illustrates a record of particle velocity motion oriented (through mathematical rotation of the 3-component data) along the raypath associated with the compressional wave first arrival. Such particle motion is associated with downgoing compressional wave first arrivals and downgoing compressional waves multiples generated in the shallow part of the stratigraphic section. Through similar mathematical rotation, FIG. 3b illustrates particle motion normal to the compressional wave raypath and lying in the vertical plane containing the compressional wave raypath, so as to emphasize downgoing shear velocity events. However, difficulties arise when the medium in which the receivers (geophones) lie is not sufficiently homogeneous and when several seismic waves cross the receiver array simultaneously—both of which normally occur in VSP. Thus, it is believed that in the typical complex subsurface environment, and particularly where converted compressional and shear modes are present, mathematical rotation of the type illustrated in FIGS. 3a and 3b may not reliably separate compressional and shear events. It is also believed that in such cases those events may not be separated reliably by the earlier mentioned technique discussed, e.g., at pages 177-182 of the Hardage document.

In contrast with the proposals discussed above, this invention makes use of the unexpected discovery that, given certain assumptions and certain knowledge from other sources, each of the compressional and shear components can be satisfactorily related analytically to the wavefield measured in the borehole 3-dimensionally (or at least in the two dimensions of the source-borehole plane more precisely, the plane defined by the source and the borehole axis).

A particular and nonlimiting example of separation in accordance with the invention can be described mathematically as follows. Let $u(x=0, z, t) = [u_x, u_z]^T$ stand for the vector wavefield measured at the borehole, with component $u_z$ along the borehole and $u_x$ perpendicular to the borehole but in the source-borehole plane. Then the compressional $u^{(p)}$ and shear $u^{(sv)}$ components of u can be determined approximately by the following expressions (Note that $u^{(p)}$ and $u^{(sv)}$ are also vectors, since P-waves and SV-waves induce particle motions along both the x and z axes).

$$\underline{u}^{(p)}(x=0,z,t) = \tag{1a}$$

$$\frac{1}{(2\pi)^2} \int_{-\infty}^{\infty} d\omega \int_{-\infty}^{\infty} dK\, \underline{J} \cdot \underline{u}(x=0,K,\omega) e^{i(Kz-\omega t)},$$

$$\underline{u}^{(sv)}(x=0,z,t) = \tag{1b}$$

$$\frac{1}{(2\pi)^2} \int_{-\infty}^{\infty} d\omega \int_{-\infty}^{\infty} dK(\underline{I} - \underline{J}) \cdot \underline{u}(x=0,K,\omega) e^{i(Kz-\omega t)}.$$

Here $u(x=0, K, \omega)$ denotes the two-fold Fourier transform of the total field, viz., $$\underline{u}(x=0,K,\omega) \equiv \int_{-\infty}^{\infty} dz \int_{-\infty}^{\infty} dt\, \underline{u}(x=0,z,t) e^{-i(Kz-\omega t)}, \tag{2}$$

I is the 2×2 identity matrix, and J is the 2×2 matrix filter $$\underline{J} = \begin{bmatrix} J_{xx} & J_{xz} \\ J_{zx} & J_{zz} \end{bmatrix}, \tag{3}$$

with components $$J_{xx} = \frac{\left(\frac{\omega^2}{V_p^2} - K^2\right)^{\frac{1}{2}} \left(\frac{\omega^2}{V_s^2} - K^2\right)^{\frac{1}{2}}}{K^2 + \left(\frac{\omega^2}{V_p^2} - K^2\right)^{\frac{1}{2}} \left(\frac{\omega^2}{V_s^2} - K^2\right)^{\frac{1}{2}}}, \tag{3a}$$

$$J_{xz} = \frac{\left(\frac{\omega^2}{V_p^2} - K^2\right)^{\frac{1}{2}} K}{K^2 + \left(\frac{\omega^2}{V_p^2} - K^2\right)^{\frac{1}{2}} \left(\frac{\omega^2}{V_s^2} - K^2\right)^{\frac{1}{2}}}, \tag{3b}$$

$$J_{zx} = \frac{K \left(\frac{\omega^2}{V_s^2} - K^2\right)^{\frac{1}{2}}}{K^2 + \left(\frac{\omega^2}{V_p^2} - K^2\right)^{\frac{1}{2}} \left(\frac{\omega^2}{V_s^2} - K^2\right)^{\frac{1}{2}}}, \tag{3c}$$

$$J_{zz} = \frac{K^2}{K^2 + \left(\frac{\omega^2}{V_p^2} - K^2\right)^{\frac{1}{2}} \left(\frac{\omega^2}{V_s^2} - K^2\right)^{\frac{1}{2}}}, \tag{3d}$$

-continued $$\text{if } |K| < \frac{\omega}{V_p} \text{ and } J_{xx} = J_{xz} = J_{zx} = J_{zz} = 0 \text{ if } |K| \geq \frac{\omega}{V_p}. \quad (3e)$$

In expressions (1a)–(3e), K is the wavenumber and omega is frequency, $V_p$ is compressional velocity in the region from which the u measurements being processed were derived, and $V_s$ is the shear velocity in the same region. These regional (or local) velocities can be estimated from, for example, sonic logs one of which uses a compressional wave source and another a shear wave source.

The filter $\hat{J}$ is a representation of the means used to decompose the total measured vector wavefield into its local plane-wave components. Operating in the Fourier transform space of expression (1a), it helps identify plane compressional waves and the shear waves can then be determined, as expression (1b) shows, by subtracting the compressional component from the total field. As the filter depends on the local compressional and shear velocities in the subsurface region where the separation is performed at the time, the process, although linear, is not space-invariant. To process the typical complete seismic profile, it is necessary to process separately each substantially homogeneous zone, with the filter $\hat{J}$ varying from zone to zone.

Referring again to FIG. 1, for an overview of the process of separating the compressional and shear components in accordance with the relationships discussed above, unit 32 performs a forward fast Fourier transform on the vector measurements for several contiguous depth levels in the borehole. For example, the initial subset processed in unit 32 can be made up of the fifth depth level from the bottom up and the four levels below and four levels above, the next subset can be made up of the sixth depth level from the bottom up and the four below and four above it, etc. The result of processing one such subset by unit 32, for example the subset centered at the fifth depth level from the bottom up, is supplied to unit 38 which performs a vector dot product operation by using a filter $\hat{J}(K,\omega)$ derived at unit 36 (in accordance with the relationship discussed above) from an acoustic log of borehole 12 stored in unit 34. Unit 40 then performs a two-dimensional inverse fast Fourier transformation of the dot product from unit 34, to thereby derive the compressional wave component of the vector measurement at the central depth level for the subset being processed, and stores it in unit 42. Unit 44 then subtracts this compressional component from the total vector measurement for the current depth level being processed (the central level of the current subset), to thereby derive the shear component for the depth level of interest, and stores it in unit 46. The operations performed by units 32, 38, 40, 42, 44 and 46 are then repeated for successive subsets by stepping up the interval of interest one depth level at a time, until the borehole depth interval of interest has been so processed. Units 42 and 46 then store, respectively, the compressional and the shear components of the total measured vector wavefield as functions of borehole depth. These components are supplied to utilization equipment 48, which can comprise equipment producing records of the type illustrated in FIGS. 3a and 3b, and/or other equipment for processing the estimates of compressional and shear components stored in units 42 and 46.

Figure 4:
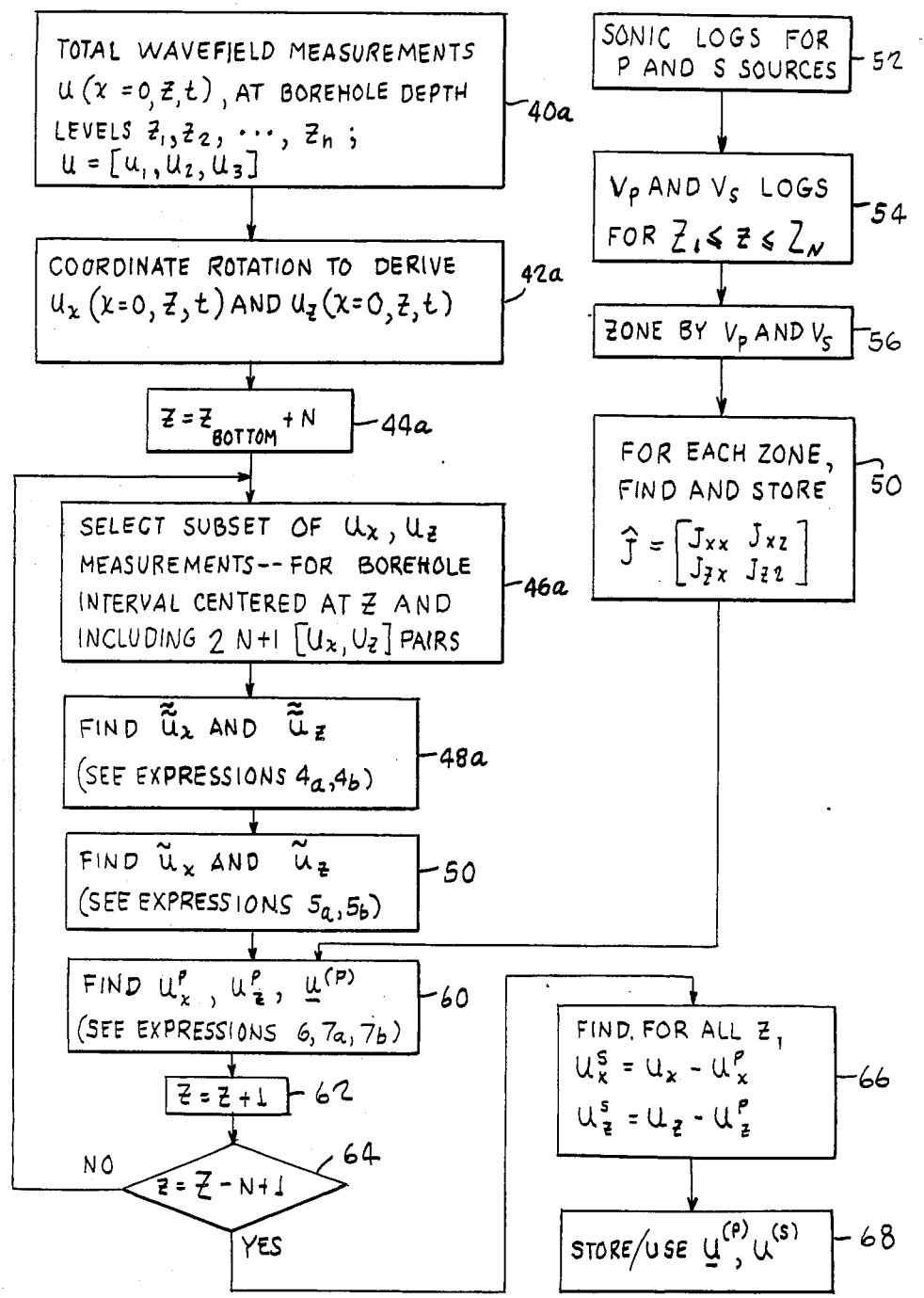
FIG. 4 is a flowchart describing certain steps of a process embodying an example of the invention.
Figure 5:
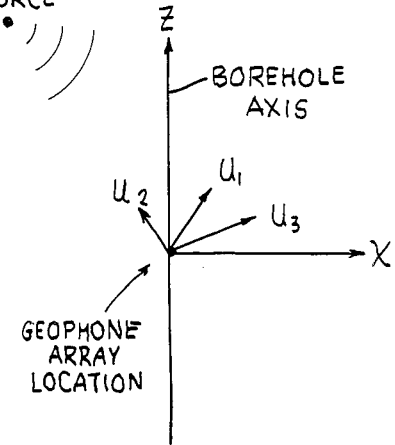
FIG. 5 is an illustration useful in explaining coordinate rotation.

In practice, the principles discussed above can be implemented in a process the major steps of which are illustrated in FIG. 4, where step 40a illustrates the derivation and storage of the total wave measurements for the borehole depth interval of interest. Referring to FIG. 5 for an illustration, the elastic wave source of the seismic wave and the borehole axis are the same plane, and axis x is also in the same plane. Each total wave measurement is taken at a given depth level in the borehole, and the geophone array produces a vector set having components in each of the three directions illustrated in FIG. 5. Two of these directions may but need not coincide with the x and z direction in the borehole-source plane. A vector set of measurements is taken at each of a number of borehole depths, typically spaced from each other by a distance of the order of meters or tens of meters, from a bottom depth at $z_1$ to a top depth of $z_N$. Returning to FIG. 4, at step 42a each of the vector sets of measurements is subjected to a coordinate rotation to find its component along the x axis and its component along the z axis illustrated in FIG. 5. The component in the direction perpendicular to the plane of FIG. 5 is not used in the remainder of the process, and need not be found. At step 44a the depth index z is set at a starting level which is N depth levels up from the lowermost measurement in the borehole, and at step 46a a subset of rotated measurements is selected which is centered at the depth level z selected at step 44a and includes N measurement sets above and N measurement sets below the depth level z. Referring to the lefhand portion of FIG. 6 for an illustration, the relevant subset of measurements $u_x$ is illustrated as a total of nine traces centered at depth level z and varying in time as illustrated. The subset of measurements for the energy along the z axis can be illustrated in the same manner.

In order to convert, the subset identified at step 46a to measurements in wavenumber-frequency space, the process at step 48a finds the one-dimensional discrete form of the Fourier transform of the subset in a procedure described by expressions (4a) and (4b):

$$\tilde{u}_x(x = 0, K_n, t) = \sum_{j=0}^{2N} u_x(x = 0, z_j, t) e^{-iK_n z_j} \quad (4a)$$

$$\tilde{u}_z(x = 0, K_n, t) = \sum_{j=0}^{2N} u_z(x = 0, z_j, t) e^{-iK_n z_j} \quad (4b)$$

Figure 6:
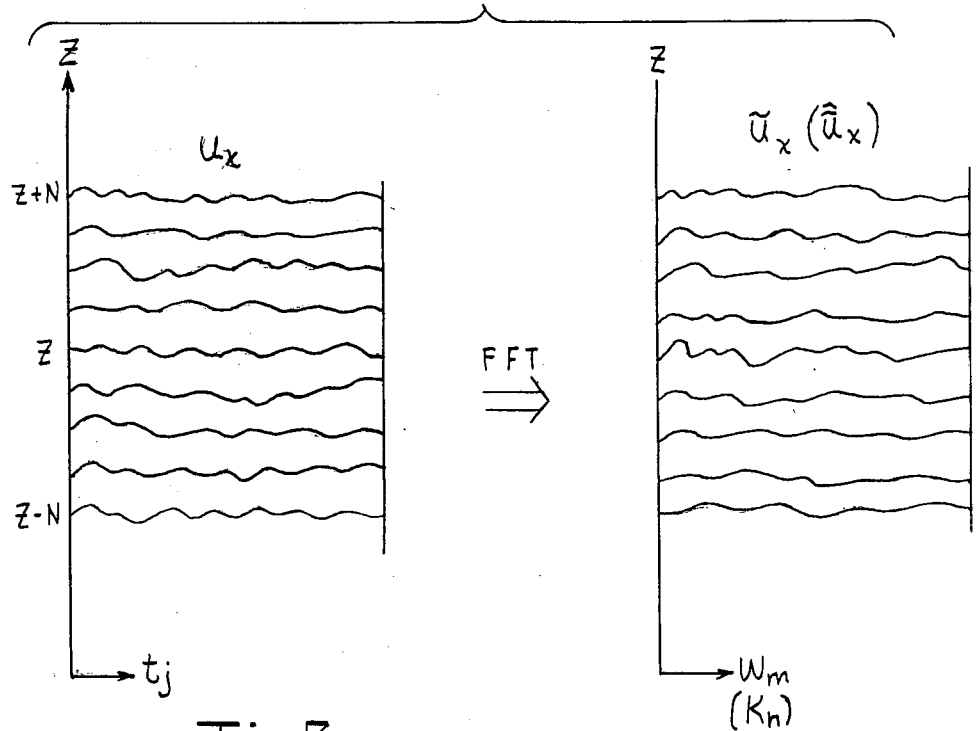
FIG. 6 is an illustration useful in explaining transformation of VSP measurements from the spatial to the wavenumber-frequency domain.

Referring to FIG. 6 for an illustration, the spatial domain traces within the window illustrated in the lefthand part of the figure are converted at step 48a to the Fourier domain traces illustrated within the window shown at the righthand side of the figure. In view of the discrete nature of the transformation process, the spatial domain traces are sampled at each of sample times j over a time interval made up of J samples, at a sampling frequency sufficient to satisfy the Nyquist requirements and over a total time interval sufficient to include the arrival of the seismic energy of interest, and the Fourier domain traces are also expressed in the form of a corresponding number of samples. Although the same symbol is used for the total number of samples in each domain, this is not necessary and the total number of samples in the Fourier domain may be less than that in the spatial domain, for example it can be 64 or 128.

Returning to FIG. 4, at step 50 the process uses the quantities found in step 48a to carry out another one-dimensional Fourier transformation in discrete form as described by expressions (5a) and (5b) to complete the transformation of the spatial domain measurements into wavenumber-frequency measurements:

$$\widetilde{\widetilde{u}}_x(x=0,K_n,\omega_m) = \sum_{j=0}^{J} \widetilde{u}_x(x=0,K_n,t_j)e^{i\omega m t_j} \quad (5a)$$

$$\widetilde{\widetilde{u}}_z(x=0,K_n,\omega_m) = \sum_{j=0}^{J} \widetilde{u}_z(x=0,K_n,t_j)e^{i\omega m t_j} \quad (5b)$$

At this time the process is ready to make use of the previously discussed filter.

Figure 7:
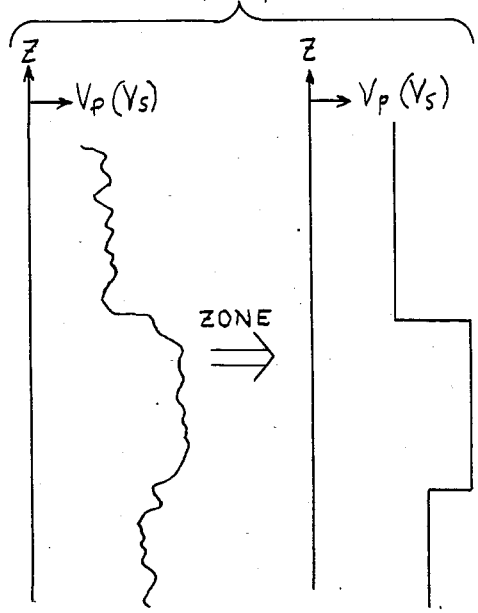
FIG. 7 is an illustration useful in explaining zoning of sonic logs.

The filter of interest can be derived from sonic logs of the same borehole which provide estimates of the compressional and shear velocities of the formation adjacent the borehole (although by using sonic frequencies much higher than that of the sesmic source used in VSP). To this end the process illustrated in FIG. 4 stores the sonic logs of interest at step 52 and, if they are in a form other than directly in units of compressional and shear velocity, converts them at step 54 into such form for the borehole depth interval corresponding to that of the measurements stored at step 40. At step 56 the compressional and shear velocity logs are zoned such that only one filter J would have to be estimated for each subsurface zone which is substantially homogeneous for the purposes of this process. Referring to FIG. 7 for an illustration, the lefthand part illustrates the amplitude variations with depth of compressional velocity (or shear velocity), and the right hand part illustrates the same velocity log after zoning it such that it has a constant value within each borehole depth interval which can be considered homogeneous for the purposes of this process. As one nonlimiting example, a zone can be considered homogeneous if the measured velocities are within a band of some percentage, e.g., 20%, of the average, with only a small minority of reasonably well dispersed excursions outside the band. Relevant considerations of zoning techniques are discussed in U.S. patent applicant Ser. No. 333,446 filed Dec. 22, 1981 and (now U.S. Pat. No. 4,486,836) and assigned to the same assignee as this application, which is hereby incorporated by reference. The result of the zoning process carried out at step 56 is used at step 58 to find, for each zone, the four matrix elements identified in expression (3), by carrying out the processes described by expressions (3a)–(3e), for each omega and K value used in the conversion into wavenumber-frequency space carried out at steps 48 and 50. The result of the process at step 58 is a respective value of the matrix filter for each of the zones identified in step 56.

At step 60, the subset of VSP measurements in wavenumber-frequency form and the filter for the borehole depth zone which corresponds to the depths at which the VSP measurements currently being processed were derived, are used to find the compressional component of the total wavefield, by carrying out a process described in expressions (6), (7a) and (7b):

$$\underline{u}^{(p)}(x=0,z,t) = \begin{bmatrix} u_x^P(x=0,z,t) \\ u_z^P(x=0,z,t) \end{bmatrix} = \quad (6)$$

$$\frac{1}{(2\pi)^2} \int\int d\omega dK \begin{bmatrix} J_{xx}J_{xz} \\ J_{zx}J_{zz} \end{bmatrix} \begin{bmatrix} \widetilde{\widetilde{u}}_x(x=0,K,\omega) \\ \widetilde{\widetilde{u}}_z(x=0,K,\omega) \end{bmatrix} e^{i(Kz-\omega t)}$$

$$u_x^P = \frac{1}{(2\pi)^2} \int\int d\omega dK [J_{xx}\widetilde{\widetilde{u}}_x + J_{xz}\widetilde{\widetilde{u}}_z]e^{i(Kz-\omega t)} \quad (7a)$$

$$u_z^P = \frac{1}{(2\pi)^2} \int\int d\omega dK [J_{zx}\widetilde{\widetilde{u}}_x + J_{zz}\widetilde{\widetilde{u}}_z]e^{i(Kz-\omega t)} \quad (7b)$$

These expressions are in integral form, for simplicity of illustration, but it should be clear that in practice they are carried out in discrete form in the same manner as discussed in connection with expressions (4a)–(5b). As indicated by expression (6), the compressional component is a vector quantity having a component along the x direction (see FIG. 5), and a component along the z direction. These two components of the compressional wave vector component are found individually through the process illustrated by expressions (7a) and (7b) but, as earlier noted, in discrete form, and are stored at step 60. A step 62 the current median depth level of the subset being processed is incremented by one depth level, to bring it to the next point up the borehole at which VSP measurements were taken, and at step 64 a check is made to see if this has brought the depth interval defined by the subset to be processed up to the top of the borehole interval of interest. If not, the process returns to step 46 to process the new subset in the same manner. If yes, the process goes to step 66, and for each depth level for which a compressional component was found, substracts the compressional component from the total energy component to thereby estimate the shear wave component, and thereby derive, for each such depth level, a shear vector component defined by the components in the x and z directions illustrated in FIG. 5. At step 68 the compressional and/or shear vector components are stored and/or used as earlier discussed, and the process ends.

Figure 8:
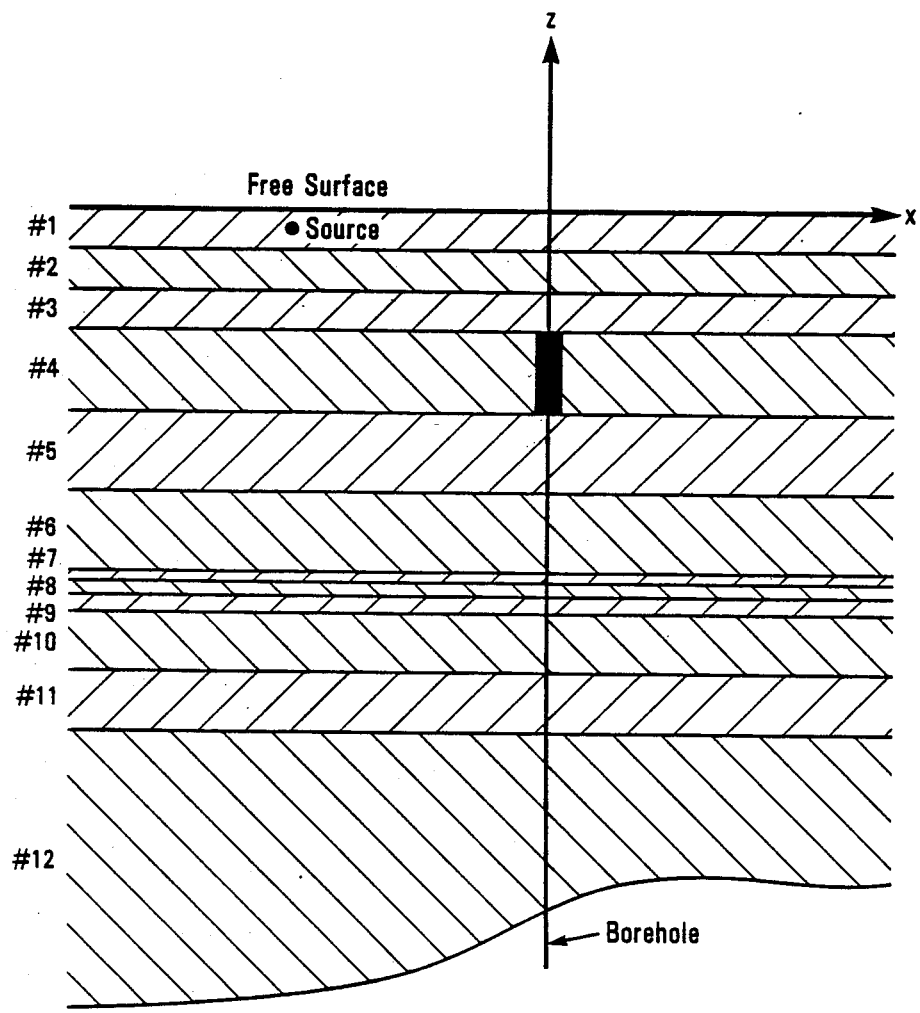
FIG. 8 illustrates a layered subsurface formation model for VSP measurements.

FIGS. 8–11 and Table 1 illustrate applying the process described above in a setting illustrative of a subsurface model which is shown in FIG. 8 and is made up of layers 1 through 12 each of which can be considered homogeneous. The thickness and compressional and shear wave speeds of each layer are given in Table 1 below: the blocked area along the borehole axis (in layer 4 in FIG. 8) indicates the section in which P wave separation was performed in accordance with the process described above. FIG. 9 illustrates in its top half the z component of the total wavefield along the borehole axis, where the borehole axis is vertical and the time axis is horizontal. The top trace is from a depth of 30 meters in the borehole, and spacing between traces is 20 meters. The vertical time lines are at 0.1 second intervals. The bottom half of FIG. 9 shows the x component of the total wavefield along borehole axis on scale corresponding to the top half. The data shown in FIG. 9 were derived by determining through a known process what the measured wavefield should be, given the formation described by the parameters in Table 1 below, and assuming that the point source of the seismic signal was located 30 meters below the free surface and 250 meters from the borehole.

TABLE 1

| Layer | Thickness (m) | $V_p$ (m/s) | $V_s$ (m/s) |
|---|---|---|---|
| 1 | 100 | 1000 | 534.5 |
| 2 | 100 | 1500 | 801.8 |
| 3 | 100 | 1750 | 935.4 |
| 4 | 200 | 2250 | 1203 |
| 5 | 200 | 1500 | 801.8 |
| 6 | 200 | 2000 | 1069 |
| 7 | 20 | 2500 | 1336 |
| 8 | 30 | 3000 | 1604 |

TABLE 1-continued

| Layer | Thickness (m) | $V_p$ (m/s) | $V_s$ (m/s) |
|---|---|---|---|
| 9 | 50 | 2750 | 1470 |
| 10 | 150 | 4000 | 2138 |
| 11 | 150 | 5000 | 2673 |
| 12 | ∞ | 5500 | 2940 |

The slopes of the curves in FIG. 9 can give a rough indication of whether a given arrival is compressional or shear: steep slopes are believed to generally indicate P wave arrivals and gentle slopes S wave arrivals.

Figure 10:
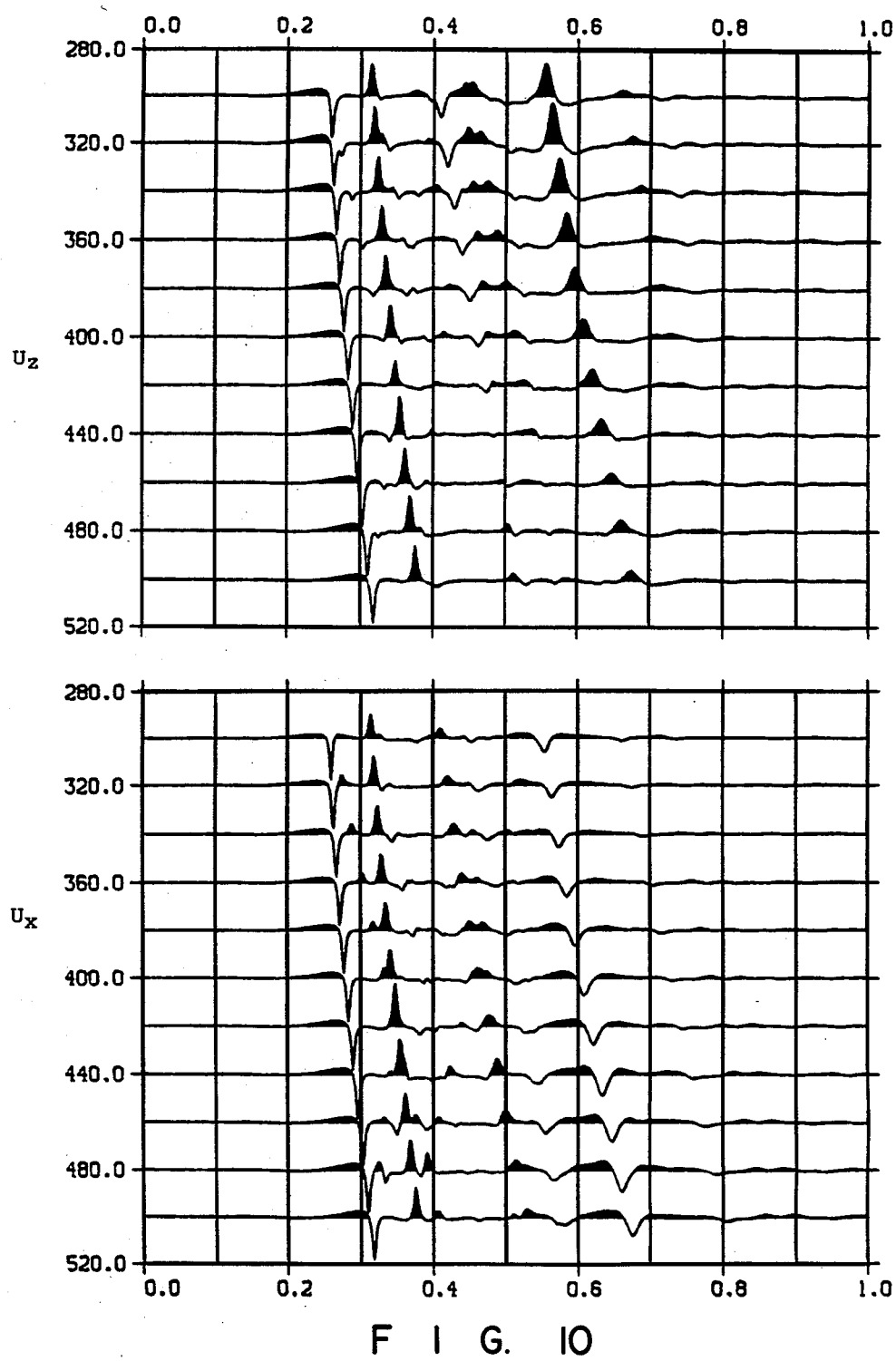
FIG. 10 shows in greater detail the portion of FIG. 9 which corresponds to layer 4 in FIG. 8.

Referring to FIG. 10, the top and the bottom halves show, respectively, the z and x components of the total velocity field within the fourth layer (where the separation was performed), again with the vertical axis being borehole depth and the horizontal axis being time.

Figure 11:
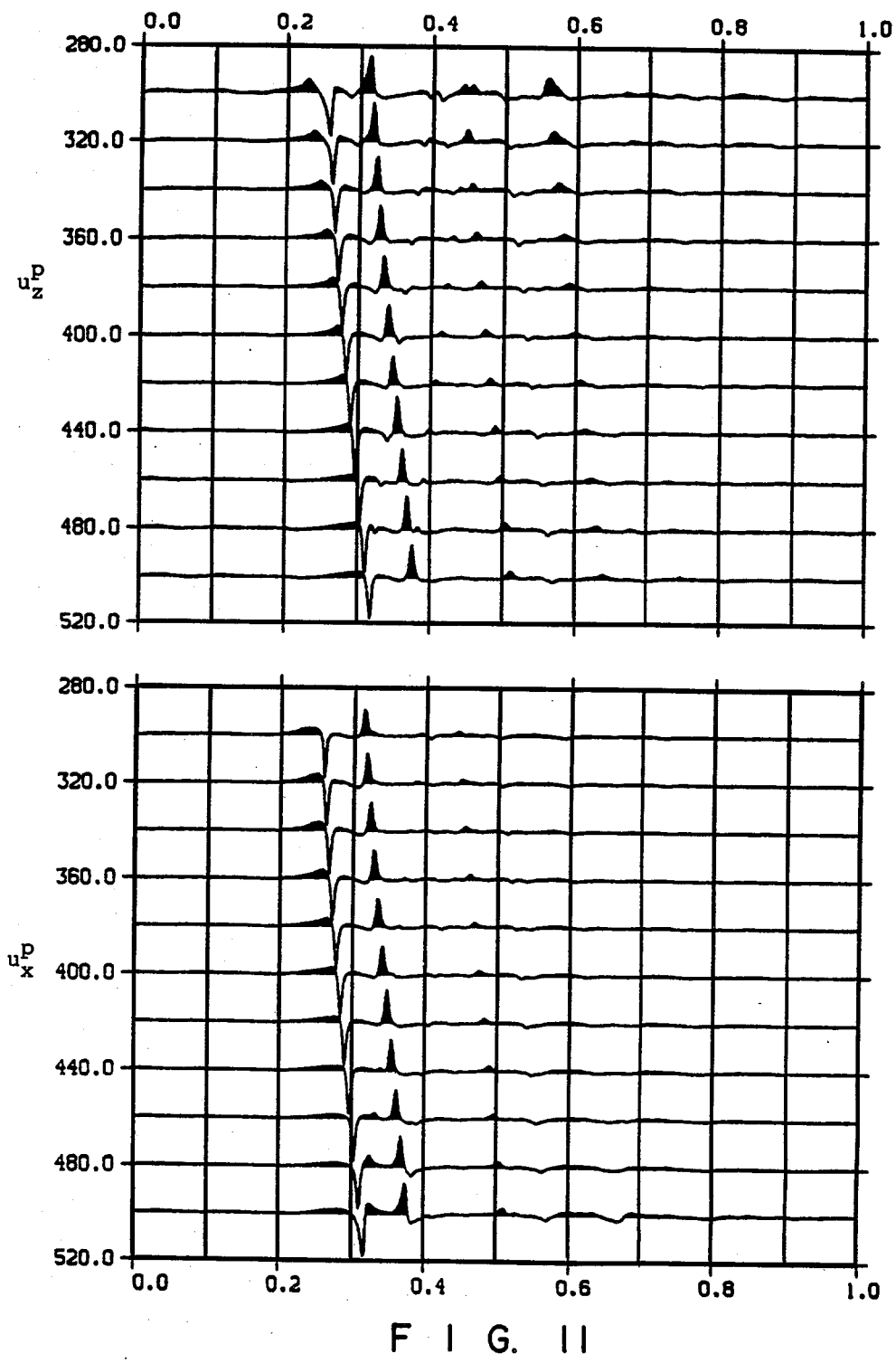
FIG. 11 shows the compressional components of the waveforms illustrated in FIG. 10, derived in accordance with an embodiment of the invention.

FIG. 11 illustrates the z and x component of the compressional wave in the fourth layer as estimated in accordance with the process described above, and illustrates the removal of the gently sloping arrivals (probably shear arrivals) from the total field. The so separated compressional component can be used for further processing and interpretation, such as the estimation of arrival time and the separation of upgoing and downgoing waves, as well as for the other end uses earlier discussed.

Figure 12:
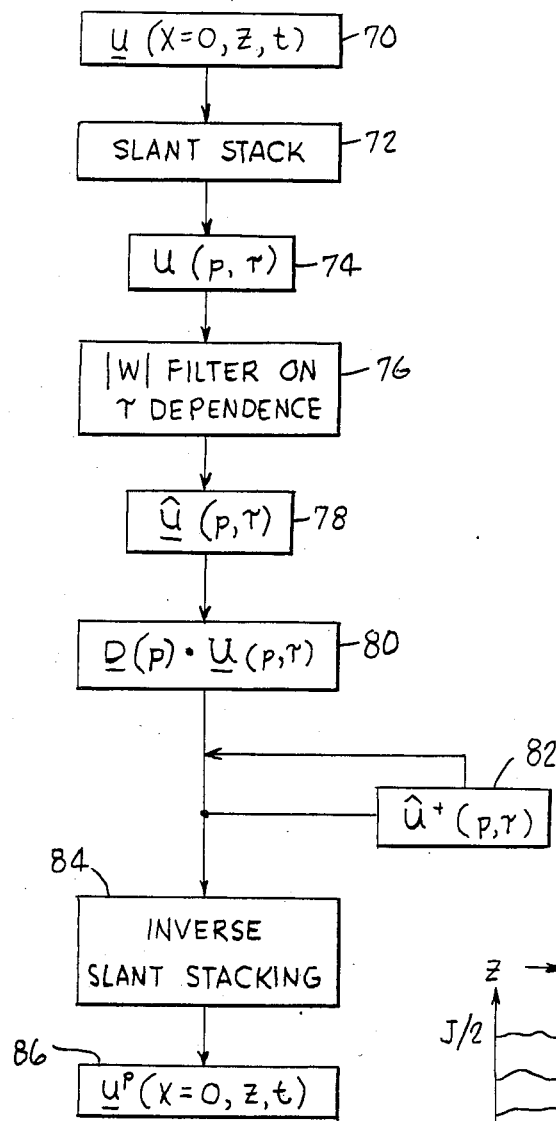
FIG. 12 illustrates steps of a process which embodies an example of the invention and is carried out entirely in the spatial domain.

While the process has been described above as using certain steps performed in wavenumber-frequency space, the corresponding process can be carried out, in the alternative, strictly in the spatial domain. Referring to FIG. 12 for a brief illustration, the process again starts, at step 70, with deriving and storing the same total wave measurements discussed in connection with step 40 in FIG. 4. At step 72 in FIG. 12 these measurements are subjected to a slant stack procedure of the type discussed in Chapman, C. H., Generalized Radon Transforms and Slant Stacks, Geophys. J. R. ASTR. Soc. (1981), 66, 445–453, hereby incorporated by reference. The result of slant stacking is, for each depth level, the quantity indicated at step 74, which has a component along the x axis (FIG. 5) and a component along the z axis, described in integral form by expressions (8a) and (8b):

$$U_x(p,t) = \int_{-\infty}^{+\infty} dz \, u_x(z, \tau + pz) \quad (8a)$$

$$U_z(p,t) = \int_{-\infty}^{+\infty} dz \, u_z(z, \tau - pz) \quad (8b)$$

Expression (8a) is shown in discrete form in expression (9a), and a corresponding discrete form expression (not shown) is used to represent the relationship of (8b):

$$U_x(p_n, t_m) = \Delta z \sum_{j=-J/2}^{+J/2} u_x(j\Delta z, \tau_m + p_n \Delta z) \quad (9a)$$

Figure 13:
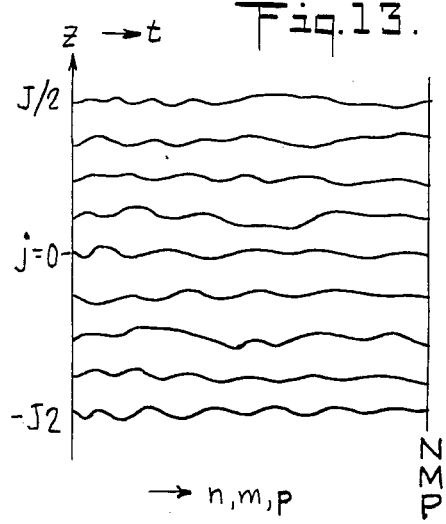
FIG. 13 shows a spatial domain window useful in explaining filtering steps illustrated in FIG. 12.

Step 72 is a process described by the discrete forms of expressions (8a) and (8b), and is performed on successive subsets of VSP measurements, in a manner similar to that discussed in connection with step 46 in FIG. 4. The type of subset used in step 72 is illustrated in FIG. 13, which shows the relevant notations (the subscripts n, m and p are indices identifying trace samples which, for the window of interest, total, respectively, N, M and P). At step 76 in FIG. 12, a filter is applied in the spatial domain to derive and store for each subset of VSP measurements the vector set indicated in step 78. This vector set comprises of a component along the x axis and a component along the z axis, and is derived in accordance with the discrete form of the relationship indicated in integral form in expression (10a) and discrete form in expression (10b), it being understood that corresponding expressions describe the component along the axis.

In expressions (9a) and (10b) the delta z and delta tau symbols refer to the inter-sample distances of the respective measures. In expressions (10a) and (10b) the tau filter h can be, for example, the filter proposed in Shepp, L. A., et al. (1974), the Fourier Reconstruction of a Head Section, IEEE Trans. Nuclear Science NS-21(3), 2143, 96, which is hereby incorporated by reference. The results are subjected to p-filtering at step 80 to derive and store the vector sets indicated at step 82, each vector set in step 82 having x and z components described by the relationships (11a) and (11b), where the elements D of the filter are defined by expression (12):

$$U_x(p,\tau) = \int_{-\infty}^{+\infty} d\tau' h(\tau - \tau') U_x(p,\tau') \quad (10a)$$

$$\bar{U}_x(p_n, \tau_m) = \Delta\tau \sum_{m'} h(\tau_m - \tau_{m'}) U_x(p, \tau_{m'}) \quad (10b)$$

$$\bar{U}_x^+(p,\tau) = D_{xx}(p)\bar{U}_x(p,t) + D_{xz}(p)\bar{U}_z(p,\tau) \quad (11a)$$

$$\bar{U}_z^+(p,\tau) = D_{zx}(p)\bar{U}_x(p,\tau) + D_{zz}(p)\bar{U}_z(p,\tau) \quad (11b)$$

$$\underline{D}(p) = \begin{bmatrix} D_{xx}(p) & D_{xz}(p) \\ D_{zx}(p) & D_{zz}(p) \end{bmatrix} = \quad (12)$$

$$\begin{bmatrix} \dfrac{(S_\alpha^2 - p^2)^{\frac{1}{2}}(S_\beta^2 - p^2)^{\frac{1}{2}}}{p^2 + (S_\alpha^2 - p^2)^{\frac{1}{2}}(S_\beta^2 - p^2)^{\frac{1}{2}}} & \dfrac{p(S_\alpha^2 - p^2)^{\frac{1}{2}}}{p^2 + (S_\alpha^2 - p^2)^{\frac{1}{2}}(S_\beta^2 - p^2)^{\frac{1}{2}}} \end{bmatrix} =$$

$$\begin{bmatrix} \dfrac{p(S_\beta^2 - p^2)^{\frac{1}{2}}}{p^2 + (S_\alpha^2 - p^2)^{\frac{1}{2}}(S_\beta^2 - p^2)^{\frac{1}{2}}} & \dfrac{p^2}{p^2 + (S_\alpha^2 - p^2)^{\frac{1}{2}}(S_\beta^2 - p^2)^{\frac{1}{2}}} \end{bmatrix}$$

$$S_\alpha = \dfrac{1}{V_p} \equiv \text{compressional slowness} \quad S_\beta = \dfrac{1}{V_s} \equiv \text{shear slowness}$$

The result is subjected to inverse slant stacking using a procedure of the type described in said Chapman publication, for example in accordance with the relationships described in integral form in expression (13a) and discrete form in expression (13b):

$$u_x^P(z,t) = \dfrac{1}{(2\pi)} \int_{-\infty}^{+\infty} dp \, \widetilde{U}_x^+(p, t - pz) \quad (13a)$$

$$u_x^P(z,t) = \dfrac{1}{(2\pi)} \sum_{n=-N/2}^{N/2} \bar{U}_x^+(p_n, t - p_n z) \Delta p \quad (13b)$$

The result is stored at step 86, in the form discussed earlier in connection with step 60 of FIG. 4, and can be used as earlier discussed.

It will be appreciated from the description above that the separation process can be conceptualized as treating the total wavefield arriving at a receiver location as being made up of a multiplicity of plane waves each of which propagates along its own direction in the borehole-source plane. Thus, one way of conceptualizing the filtering process described above is to consider it as decomposing the total local wavefield measured at a receiver location into local plane waves which are in the receiver-source plane. In the case of VSP, this plane is the borehole-source plane, and in the case of horizontal seismic profiling this plane includes a line of receivers and the source. In the case of a deviated borehole, this plane includes a reasonably straight interval of the borehole or the straight borehole defined by measurements synthesized from those taken along a deviated axis. Once the total local wavefield has been decomposed into such plane waves, the compressional and/or shear wave component of each local plane wave can be found by the polarization thereof, as the direction of propagation of each local plane wave is known from the decomposing process (the compressional component is that along the direction of propagation and the shear component is that normal to it in the plane of interest). Separately, recombining the local plane waves' compressional or shear components gives the separated compressional and/or shear component of the total wavefield.

As will be appreciated by those skilled in the art, the processes described above can be carried out by means of commercially available digital computer equipment which has been programmed and arranged in accordance with the teachings above to carry out the requisite steps. As least some of those steps can be carried out by dedicated equipment; for example the equipment carrying out the functions of units 32 and 40 in FIG. 1 can be commercially available dedicated FFT processors. Others of the relevant process steps can also be carried out by dedicated (hardwired or firm wired processing equipment). In each case, the processing equipment when carrying out the invented processes performs as a special purpose system which derives the requisite measurements of seismic energy and the requisite filter and uses them for compressional/shear separation in accordance with the invention. It will also be appreciated that various modifications, alternate constructions and equivalents may be employed without departing from spirit and scope of the invention and that, therefore, the above description and illustration should not be construed as limiting the scope of the invention, which is defined by the appended claims.

We claim:

1. A method comprising:
    deriving measurements of seismic energy received along each of two transverse directions in a plane which includes a line of receiver locations and a seismic source, and deriving a filter which depends on local acoustic properties of subsurface formations near the line of receiver locations; and
    using said measurements and said filter to decompose the total local wavefield represented by said measurements into local plane waves which are in said receiver-source plane and to identify by the polarizations at least one of (i) the compressional wave components of said local plane waves and (ii) the shear wave components of said local plane waves; and
    separately recombining the identified components of the local plane waves to thereby separately estimate at least one of (i) the compressional components of the wavefield represented by said measurements and (ii) the shear components of the wavefield represented by said measurements.

2. A method as in claim 1 in which said measurements are vertical seismic profiling measurements of the energy received at respective locations spaced from each other along a borehole and said receiver-source plane includes the borehole axis.

3. A method as in claim 2 in which the step of deriving the filter comprises estimating the local compressional and shear velocities of the formation near the borehole and making the filter depend on the estimated velocities.

4. A method as in claim 3 in which the step of deriving the filter includes zoning the estimates of compressional and shear velocities into zones whose depth extent is at least three times the wavelength of the wavefield from said source and in each of which the compressional and shear velocities are substantially constant within defined parameters.

5. A method as in claim 4 in which the step of deriving the vertical seismic profile measurements comprises logging the borehole with a multicomponent tool to derive a vector measurement for each receiver location, and rotating the vector by coordinate transformation to derive, for each receiver location, measurements of the energy received along the transverse directions which are in the borehole-source plane and one is along the borehole axis and the other is perpendicular thereto.

6. A method as in claim 5 in which the using step comprises separating said measurements into successive windows which overlap substantially in terms of borehole depth interval and each of which includes a receiver location of interest as well as several receiver locations above the location of interest and several receiver locations below the location of interest, and carrying out said decomposing into local plane waves separately for each window.

7. A method as in claim 6 in which said using step includes converting the measurements into corresponding representations of said measurements in wavenumber-frequency space and applying said filter to the measurements in wavenumber-frequency space.

8. A method as in claim 7 in which said filter is in the form of a matrix which is a function of the local compressional and shear velocities and of wavenumber and frequency.

9. A method as in claim 8 in which said filter comprises a four-element matrix.

10. A method as in claim 5 in which said using step is performed entirely in the spatial domain.

11. A method as in claim 1 in which said measurements are horizontal seismic profiling measurements of the energy received at respective locations spaced from each other along the earth surface and in line with a source of seismic energy.

12. A method as in claim 1 in which the using step comprises separately estimating both the compressional and shear components of the wavefield.

13. A method as in claim 1 including the step of providing a tangible record of the estimated components of the wavefield.

14. A method as in claim 13 including the step of displaying a visual representation of said record.

15. A method as in claim 1 in which the using step comprises converting the measurements into a representation of a wavenumber-frequency space and operating thereon with said filter in wavenumber-frequency matrix form.

16. A method as in claim 1 in which the using step is performed entirely in the spatial domain.

17. A method as in claim 1 in which said filter is in the form of a 2×2 matrix and the measurements are in two-component matrix form.

18. A method comprising:
deriving vector measurements of seismic energy received at locations spaced from each other along a borehole, and deriving a matrix filter which is related to local compressional and shear velocity of the formations near the borehole;
forward Fourier transforming the measurements to convert them into representations in wavenumber-frequency space and applying said filter thereto in said space and subjecting the resulting filtered measurements to inverse Fourier transformation to thereby derive an estimate of the compressional vector component of the total measured wavefield.

19. A method as in claim 18 in which the shear component of the total wavefield is estimated by vector subtraction of the estimated compressional component from the total wavefield vector measurements.

20. A system comprising:
means for deriving measurements of seismic energy received along each of two transverse directions in a plane which includes a line of receiver locations and a seismic source and for deriving a filter which depends on local acoustic properties of subsurface formations near the line of receiver locations; and
means for using said measurements and said filter to decompose the total local wavefield represented by said measurements into local plane waves which are in said receiver-source plane and to identify by their polarizations at least one of (i) the compressional wave components of the local plane waves and (ii) the shear wave components of the local plane waves and separately recombine the identified components of the local plane waves to thereby separately estimate at least one of (i) the compressional components of the wavefield represented by said measurements and (ii) the shear components of the wavefield represented by said measurements.

21. A system as in claim 20 in which the means for using said measurements comprises means for identifying both the compressional and the shear wave components of the local plane waves and for recombining the identified components to thereby separately estimate each of the compressional and shear components of the wavefield.

22. A system as in claim 20 in which the means for deriving the filter comprise means for estimating at least one of the local compressional and shear velocities in the region of selected receivers and for utilizing the estimates in deriving the filter.

23. A system as in claim 22 in which the local estimates are derived from borehole logging of selected subsurface formations.

24. A system as in claim 22 in which the local estimates are over intervals each extending over at least about three wavelengths of the seismic energy.

25. A method comprising:
decomposing 3-component measurements of seismic energy into selected local plane wave components;
identifying by polarization at least one of the compressional waves and the shear waves of selected plane wave components of the seismic energy represented by said measurements to thereby derive at least one of a set of local compressional waves and a set of local shear waves; and
separately recombining the local waves of at least one of the sets to thereby estimate at least one of the compressional and shear components in a selected plane of the seismic energy represented by said measurements.

26. A method comprising:
decomposing vector measurements of a wavefield in a selected medium into selected local plane wave components, said wavefield including both compressional and shear waves;
identifying by polarization at least one of the compressional and the shear waves of selected plane wave components of said wavefield to thereby derive at least one of a set of local compressional waves and a set of local shear waves; and
separately recombining the identified local waves of at least one of the sets to thereby estimate at least one of the compressional and shear components in a selected plane of the wavefield represented by said measurements.

27. A method as in claim 26 in which the identifying step comprises estimating selected local responses of the medium to said wavefield, using the estimates to derive a filter and applying the filter to the measurements to effect said decomposition.

28. A method as in claim 26 in which the wavefield is a seismic wavefield and the medium comprises subsurface formations.

29. A method as in claim 28 in which the measurements comprise VSP measurements.

30. A method as in claim 29 in which the local responses of the medium comprise estimates of local compressional and shear velocities of the subsurface formations derived at least in part from borehole logging.

31. A method as in claim 27 in which the filter is multichannel and multidimensional.

32. A method as in claim 27 in which the filter is multichannel and multidimensional and approximates a filter having an impulse response which is substantially infinite both spatially and temporally.

33. A method as in claim 27 in which the wavefield comprises a seismic wavefield and the medium comprises subsurface formations, and the measurements comprise measurements taken in at least one borehole traversing the subsurface formations.

34. A method as in claim 27 in which the wavefield comprises a seismic wavefield and the medium comprises subsurface formations, wherein at least one of (i) the source of the seismic wavefield and (ii) a set of locations at which said measurements are taken, is in a borehole traversing the subsurface formations.

35. A method as in claim 27 in which the wavefield comprises a seismic wavefield and the medium comprises subsurface formations, wherein at least one of (i) the source of the seismic wavefield and (ii) a set of locations at which said measurements are taken, is at or near the surface of said formations.

36. A method as in claim 27 in which the wavefield comprises a seismic wavefield and the medium comprises subsurface formations, wherein only one of (i) the source of the seismic wavefield and (ii) a set of locations at which said measurements are taken, is in a borehole traversing the subsurface formations.

* * * * *